2,959,476
METHOD OF CONTROLLING AQUATIC PLANTS

Johannes Van Overbeek, Modesto, Calif., assignor to Shell Oil Company, a corporation of Delaware No Drawing. Filed June 2, 1959, Ser. No. 817,464

12 Claims. (Cl. 71—2.7)

This invention relates to a novel treatment of water to control aquatic life and, more particularly, to the addition of acrolein to bodies of water such as canals, rivers, lakes, etc., for the purpose of destroying undesirable aquatic life such as aquatic weeds and water snails.

This application is a continuation-in-part of copending application Serial No. 660,223, filed May 20, 1957, now abandoned.

In the past, submerged aquatic weeds and flora of all types have caused grave economic problems in water distribution and drainage systems. This is particularly true in the irrigated portions of the western states where aquatic weeds interfere either directly or indirectly with the rapid and efficient delivery of irrigation water to dry areas. These weed pests increase loss from seepage and evaporation, engender the rapid collection of silt, tend to bring about canal breaks and in other ways constitute a most serious regional problem. In canals, rivers and streams they interfere with navigation, and in ponds and lakes tend to materially limit the usefulness of such bodies of water for either recreational or commercial purposes.

The majority of these aquatic weeds are rooted in soil in the sides and along the bottom of irrigation canals, growing almost entirely beneath the water surface. When found in ditches with high water velocity, these plants appear to start near the edge where the velocity is less or in the flatter portions of the ditch and subsequently spread into the higher velocity sections. Once established the submerged plants act as their own velocity reducer thus bringing about further propagation downstream. Most of these plants are of the genus Potamogeton in the family Nayadaceae. To a large extent, these and similar underwater plants are prevalent because of their many and varied means of propagation. For example, aquatic weeds are generally able to reproduce by seeds, by creeping roots, and by small tubers in the silt which may be moved from the weed patch to uninfested areas when ditches are cleaned by mechanical methods. Chemical aquatic herbicides such as copper sulfate, chlorinated benzene compounds and various solvents have all proved unsatisfactory because of their rapid dissipation in water, their relatively high cost and over-all inefficiency. These chemicals tend to dissipate too quickly to be effective for extended periods of time or over great distances, and in certain cases, as with the xylenes and chlorinated benzene compounds, the active material tends to separate from the water and, therefore, lose its effectiveness. In addition, copper sulfate tends toward superficial burning of leaves without the killing of the roots. The long-felt need for an effective chemical herbicide is most acute in open canals and irrigation systems, first, because uncontrolled aquatic weeds quickly render irrigation systems totally inoperative, and second, because in tropical areas these open canals contain disease-transmitting water snails.

It is consequently the principal object of the present invention to provide a method for clearing bodies of water, such as canals and ponds, of undesirable flora by treating the water with a chemical which manifests herbicidal effectiveness for extended periods of time and over relatively long distances without exhibiting the shortcomings of prior water treatment methods.

Another object of the present invention is to provide a method for clearing bodies of flowing water such as streams and irrigation ditches of undesirable flora by treating the water at a substantial distance from the submerged flora with a chemical which can be effectively carried by the water into contact with the submerged weeds.

Yet another object of the present invention is to provide a method for clearing still bodies of water, such as ponds and lakes, of undesirable flora by treating water with a chemical which can be effectively carried into contact with the undesirable submerged plant life.

Yet another object of the present invention is to provide a method for clearing bodies of water of undesirable flora by treating the water with an herbicidally effective quantity of a chemical which not only kills the undesirable plant life but also causes the plant life to disintegrate so that it does not inhibit the free flow of water.

Still another object of the present invention is to provide a method of clearing bodies of water of undesirable flora by treating the water with an herbicidally effective quantity of a chemical which kills submerged flora.

Still another object of the present invention is to provide a method of clearing bodies of water of undesirable aquatic life such as snails by treating the water with an effective quantity of a chemical which also controls aquatic weeds.

Other objects, features and advantages of the present invention will be apparent from the following description read in conjunction with the appended claims.

It has now been discovered that the injection of acrolein into bodies of water containing noxious aquatic weeds admirably satisfies the requirements of an effective aquatic herbicide and, in addition, manifests unique and altogether surprising properties heretofore unknown in this art. For example, acrolein treatment of water appears to be effective against aquatic life for extended periods of time and for remarkably long distances. Yet crops in the vicinity of the acrolein treatment as well as crops directly exposed to the treated water remain unaffected. In other words, in the dosages employed for the purposes of the present invention, acrolein manifests a remarkable and altogether unique specificity for aquatic plants as compared to terrestial plant life. Moreover, it has been discovered that aquatic weeds exposed to acrolein tend to disintegrate, thus obviating the serious clogging problem heretofore present when irrigation ditches and canals were chained. Additionally, it has been found that acrolein addition to water is highly effective in combating water-inhabiting snails.

The quantity of acrolein employed for the purposes of the present invention may vary considerably but should, generally speaking, not be less than one part per million nor, for practical purposes, exceed 10,000 parts per million. An optimum quantity is approximately 20–50 parts per million. A range of 10–70 parts per million is highly desirable. For ponds not less than 1.5 p.p.m., is recommended. At temperatures above 70° F., 1.5 to 6 p.p.m. is preferably employed in ponds; at temperatures below 70° F., 3 to 9 p.p.m. is satisfactory. Factors considered in ascertaining the quantity of acrolein employed are water flow, water temperature, velocity, and, of course, weed density. Water flow in streams and canals is generally stated in cubic feet per second or miner's inches and, for practical purposes, the quantity of acrolein employed may be expressed in these terms. For example, if acrolein is employed at 2 gal./c.f.s. for a stream flowing 10 c.f.s., a total of 20 gallons of acrolein will be employed. Generally, the acrolein is added over a time interval to form a blanket or wave of treated water which moves down stream contacting all weeds in its path. Employing this wave-type treatment, it has been found that acrolein manifests an extraordinary effectiveness, 15 and, in some instances, as much as 25 miles from the point of initial injection up stream.

Since the effective concentration of acrolein is, in a sense, dependent upon the period of exposure, the dose of acrolein employed may be expressed as a constant. This constant is the product of the time of exposure in minutes and the concentration of herbicide employed expressed in p.p.m. For example, an exposure time of 30 minutes employing a concentration of 50 p.p.m. gives a constant of 1500 part per million-minutes. In some instances, a constant of 1500 is considered minimum. It will be readily understood, however, that the quantity of herbicide employed and the period of exposure may vary greatly without departing from the scope of the invention. Thus, it will be evident that the maximum concentration of herbicide employed and the maximum time of exposure are limited to a very great extent by economic and other practical considerations. Generally speaking, it is preferred that the period of injection range from 30 to 300 minutes.

For the purpose of commercial application, experiments were carried out to test the proposition that the product of concentration and time can, if desired, be expressed as a constant. Tests were run in large slow-moving canals, the test results being compared to earlier tests in the same canals in which shorter times and slightly higher dosages were employed. Applications of 100 and 300 minutes gave weed control substantially equal to shorter treatments of 45–65 minutes, even with slightly lower dosages. In another series of tests, ditches which were all part of the single irrigation system were treated with acrolein at application times of 15, 103, 120, 190 and 240 minutes. Other ditches in the same irrigation system were treated for 30–45 minutes in the same dosage range. These tests tended to support the finding that the product of concentration and time is a constant which under ordinary circumstances may be employed to ascertain the quantity of acrolein which should be employed in both moving bodies of water, such as streams and canals, and still bodies of water such as lakes and reservoirs. It is apparent, however, that the concentration of acrolein used as well as the time period of exposure will vary with the specific conditions of each application.

Field research shows that acrolein is somewhat more effective at warm temperatures. Hence, suggested dosages for canals and streams having a temperature above 70° F. is 1–2 gal./c.f.s. For canals and streams having a temperature below 70° F., dosage levels are preferably maintained at 2–3 gal./c.f.s.

It has also been observed that in fast-flowing streams and canals, i.e., streams and canals of linear velocity greater than 2.5 ft./sec., aquatic weeds are compacted and bent by the water, bringing about a channeling of water flow. This channeling in both streams and canals can prevent aquatic plants from being effectively exposed to the available toxicant. It has been found preferable, therefore, in such fast-flowing bodies of water to increase the dosage rate of acrolein and extend the period of injection.

In operation the blanket or wave of acrolein moves downstream and is exhausted through absorption by weed tissue and vapor loss. Hence, in longer canals and streams, it is sometimes desirable to reinforce the wave or blanket of acrolein at points downstream from the initial application. The distance through which a given dose of acrolein will be effective depends on varying factors of water temperature, density of vegetation, rate of flow, etc. It has been found, however, that the extraordinary effectiveness of acrolein as an aquatic herbicide has been observed without additional injection downstream at distances of 15 miles and more, and algae control has been observed for distances well in excess of 15 miles. In ponds and other still bodies of water, acrolein normally will remain in contact with the aquatic weeds for a more extended period of time than in a flowing stream or canal. Hence, lower concentrations may be effectively employed.

It has been found desirable in still bodies of water such as irrigation reservoirs and ponds to lower the water level to a minimum before adding the acrolein. The acrolein is then injected into the incoming water as the reservoir is refilled. It is desirable to inject the acrolein during the entire filling period to effect maximum distribution of the toxicant. Alternatively, it is possible to add the acrolein at selected points around the margin or bank of the still body of water. Acrolein may also be added to still bodies of water by means of a boom extending out over the water from the metering equipment on the shore. Water for mixing and injecting the acrolein may be obtained from the pond or the reservoir or may also be supplied by a tank truck.

Following application, it is preferable to maintain the treated water in the pond or reservoir for several days to increase distribution and prolong contact of the acrolein with the weeds. The dosage of acrolein into such still bodies of water such as irrigation water and ponds may vary considerably. Generally speaking, it has been found through extensive field testing that an effective concentration of 0.5–2 gal./acre ft. (1.5–6 p.p.m.) is highly effective at temperatures above 70° F. A dosage level of approximately 1–3 gal./acre ft. (3–9 p.p.m.) is effective at temperatures below 70° F.

Acrolein is highly effective in both moving and still bodies of water against algae and completely submerged plant life. Among the species of algae controlled by normal dosages are Chara sp., Cladophora sp., *Cladophora glomerata, Hydrodictyon reticulatum,* and Spirogyra sp. Acrolein is most effective against completely submerged aquatic plant life but has also been found effective against floating forms of plant life such as Pistia, Eichornia and Jussiaea. Of great significance is the fact that acrolein does not appear to affect the plant life on the banks adjacent to the treated bodies of water when employed in concentrations toxic to aquatic life. Hence this toxicant may be employed with safety in areas in which crops are being grown. This unique specificity of acrolein for water weeds in concentrations which leave terrestial plants totally unaffected constitutes one of the most important advantages of the present invention over aquatic herbicides heretofore used.

The following examples show the very extensive testing of acrolein as an aquatic herbicide in both still bodies of water and moving streams and irrigation ditches. As clearly evidenced by these examples, acrolein manifests an extraordinary effectiveness for very extended distances and brings about a deterioration of the noxious aquatic plant life so that free flow of water is effected undiminished by clogging dead plant life. In all of the following tests, the unique effect of acrolein in bringing about the deterioration of water weeds is graphically shown by the increase in water flow after treatment.

*Example I*

An irrigation canal fifteen miles in length having a water flow of 75 cu. ft./sec. and containing heavy stands of weeds, particularly *P. crispus,* was treated with acrolein. Two hundred twenty gallons of acrolein were added to the irrigation ditch employing an Ekstrom meter, an eductor and pump. One hundred ten gallons were added at 5.5 miles downstream. The water flow was increased from 75 cu. ft./sec. to 300 cu. ft./sec. by opening the irrigation canal valves after one hour of treatment. Excellent control of aquatic weeds was observed for 15 miles. Before the addition of acrolein the aquatic weed growth was clearly visible along the floor of the canal. After acrolein treatment this weed growth was no longer apparent. Moreover, there was no evidence of large pieces of dead stems or leaves in the water. The weeds had deteriorated due to the contact with acrolein.

Example II

An irrigation ditch fifteen miles in length and containing heavy stands of weeds, mostly *P. crispus*, was treated with 200 gallons of acrolein with a booster shot of 110 gallons at a distance of 5.5 miles from the initial injection. The water flow in this fifteen-mile ditch was increased by opening the irrigation canal valves from 75 cu. ft./sec. to 275 cu. ft./sec. in one hour following treatment. After treatment with acrolein the weeds withered and disintegrated to such an extent that the change was apparent to casual observers. There was no evidence of large pieces of dead weeds floating in the ditch at any point along its entire fifteen-mile length. The capacity of the canal was significantly increased.

Example III

An irrigation ditch fifteen miles in length and containing heavy stands of weeds was treated with 220 gallons of acrolein in 100 cu. ft./sec. of water. After three hours the water flow in the canal was increased in 300 cu. ft./sec. by opening the irrigation canal valves. A booster shot of 90 gallons of acrolein was added at approximately 5.5 miles distance from the initial injection. Good kill of weeds was observed for the entire fifteen-mile length of the canal. Whereas before treatment heavy stands of weeds seriously inhibited the flow of water in the ditch, after treatment flow was substantially increased due to weed deterioration. The capacity of the canal was increased from 279 cu. ft./sec. before treatment to 480 cu. ft./sec. after treatment.

Approximately eight weeks after the initial treatment, the canal was retreated with 220 gallons of acrolein while water flow was maintained at 75 cu. ft./sec. After the injection of acrolein, the water flow of the canal was increased to 300 cu. ft./sec. by opening the irrigation canal valves. A booster shot of 110 gallons of acrolein was metered into the canal. Good kill of aquatic life was observed for the entire 15 miles of canal.

Approximately eleven weeks after the initial treatment the canal was retreated with 220 gallons of acrolein while water flow was maintained at 75 cu. ft./sec. Immediately after injection, the water flow in the canal was increased to 275 cu. ft./sec. by opening the irrigation canal valves. A booster shot of 110 gallons was metered into the main wave of acrolein at approximately 5.5 miles from the initial injection. Again, complete control of aquatic weeds was observed for the entire 15 miles of canal without the presence of large segments of dead weed stems, roots and leaves.

Example IV

A drainage ditch 1.6 miles in length and containing submerged weeds, particularly Potamogeton and Elodea, was treated with 1.4 gallons per cu. ft./sec. of acrolein in 40 minutes (80 p.p.m.) employing a gravity flow injecting device. No wave pattern was observed, the linear velocity of the drainage ditch being approximately 0.5 miles per hour. One hundred percent increase in capacity was observed for the full length of the ditch after treatment.

Example V

An irrigation ditch 4.0 miles in length and containing Potamogeton, Elodea, and algae was treated with 1.5 gallon per cu. ft./sec. of acrolein in 40 minutes (84 p.p.m.) employing a gravity flow saran tube meter, the irrigation ditch temperature being approximately 72° F. The water flow was maintained at 20 cu. ft./sec. The undesirable Potamogeton and Elodea algae were killed by this dosage of acrolein. The treated water was then employed to irrigate castor beans, cotton and corn. Though the acrolein was highly effective in killing the undesired aquatic life, there was no observable effect when the water containing the acrolein was passed over these crops. This field test illustrates the extraordinary specificity of acrolein for aquatic plants when employed in conformance with the teaching of the present invention.

Example VI

An irrigation ditch 20 miles in length and containing weed species of Potamogeton, Elodea, algae and other noxious growth was treated with 1.5 gallons cu. ft./sec. in 45 minutes (75 p.p.m.), the temperature of the water being approximately 75° F. The water flow was maintained at 100 cu. ft./sec. No booster shot was employed during this field trial. At no point along the entire 20-mile length of the stream was large floating plant debris visible.

Example VII

An irrigation ditch 20 miles in length and containing heavy growth of Potamogeton, Elodea, algae and other noxious growth was treated with 1.0 gallon cu. ft./sec. in 31 minutes (64 p.p.m.), the temperature of the water being approximately 66–70° F. The water flow was maintained at 117 cu. ft./sec. Weeds were killed by the acrolein 20 miles from the point of injection. The capacity of this irrigation ditch was increased 150 cu. ft./sec. in one week. This remarkable increase in water capacity was due to the deterioration of the aquatic weeds along the entire length of the canal.

Example VIII

An irrigation ditch 28 miles in length and containing several species of Potamogeton, particularly Sago Pond weeds, Zannichellia and algae, was treated with 250 gallons over a period of 52 minutes followed by treatment with 64 gallons over a period of 70 minutes at a distance of 8.5 miles from the initial injection 7.5 hours later. The initial temperature of the water was 61° F. The temperature of the water during the booster injection was 64° F. at the point of booster injection. The temperature of the water 12 hours after initial injection at a point 12.3 miles from the point of original injection was 67° F. The temperature of the water 21.5 hours after initial injection at a point 23.2 miles from the point of initial injection was 76° F. Aquatic weeds were killed along 23 miles of the canal due to arcolein treatment. In fact, the canal was so completely cleared of aquatic weeds that retreatment was considered unnecessary for more than two months. Shortly after the canal water was treated with acrolein, this water was employed to irrigate sugar beet crops. The sugar beets were not deleteriously affected by the acrolein-treated water.

Example IX

An irrigation canal containing river water 24.3 miles in length and containing dense stands of *Potamogeton Richardsonii, Potamogeton foliosus,* Elodea and other noxious plant growth was treated with 74 gallons of acrolein in 55 minutes employing an Ekstrom meter and eductor. The water flow was 50 cu. ft./sec. Aquatic weeds were killed along the entire length of the river, yet only small pieces of plant debris were in evidence because of the weed disintegration caused by the acrolein.

Example X

Several reservoirs and one marine lagoon were treated with acrolein to kill aquatic weeds. In all tests excellent control of weeds was obatined with concentrations of acrolein as low as 1.5–10 p.p.m. Contact time was generally maintianed for 2–5 days. Due to the tendency of the killed weeds to disintegrate because of the employment of acrolein, in two to three weeks all weed life disappeared. This method of killing aquatic weeds in reservoirs and marine lagoons is a very significant advance in the art over methods heretofore considered necessary.

In the past reservoirs and marine lagoons were chained to diminish noxious aquatic plant life. Now aquatic weeds can be destroyed more rapidly, completely and economically than ever considered possible by those well versed in the art.

It will be understood that the acrolein employed for the purposes of the present invention may be combined with insert ingredients or other compounds which are effective as aquatic herbicides or which manifest other desirable properties in the treatment of bodies of water such as irrigation ditches and reservoirs. It will also be understood that any conventional method of injecting the acrolein into the water may be employed for the purposes of the present invention. For example, an eductor employing the venturi principle to develop reduced pressure in combination with a conventional pump having sufficient capacity to provide the necessary pressure for the eductor to operate properly may be employed. Other expedient and/or desirable methods of application of acrolein for the purposes of the present invention will be apparent to those well versed in the art.

Though the present invention has been described with particular reference to certain optimum conditions and concentrations, the invention is not limited by the examples set forth. Rather, the application of acrolein to any body of water for the purposes of killing aquatic life contained therein is broadly contemplated by the present invention.

I claim as my invention:

1. The method of treating a body of water to control aquatic life comprising adding acrolein to said body of water at a rate sufficient to control said aquatic life.

2. The method of treating a still body of water to control aquatic plant and animal life comprising adding acrolein to said still body of water at a rate sufficient to control said aquatic life.

3. The method of treating a still body of water to control aquatic plant and animal life comprising adding acrolein to said still body of water in a quantity toxic to said aquatic life.

4. The method of treating a still body of water containing aquatic life to control said aquatic life contained therein comprising adding acrolein to said body of water in a quantity toxic to aquatic life.

5. The method of treating a still body of water containing aquatic life to control said aquatic life contained therein comprising lowering the water level of said still body of water and raising the water level of said still body of water while simultaneously adding acrolein to said still body of water to a concentration sufficient to control said aquatic life, whereby maximum distribution of said acrolein in said water is effected.

6. The method of treating a still body of water having a temperature in excess of 70° F. and containing aquatic life to control said aquatic life contained therein comprising lowering the water level of said still body of water, and raising the water level of said still body of water while simultaneously adding acrolein to said body of water, whereby maximum distribution of said acrolein in said water is effected, said acrolein being present in said water in a concentration ranging between approximately 1.5 and 6 parts acrolein per million parts of water.

7. The method of treating a still body of water having a temperature less than 70° F. and containing aquatic life to control said aquatic life contained therein comprising lowering the water level of said still body of water, and raising the water level of said still body of water while simultaneously adding acrolein to said body of water, whereby maximum distribution of said acrolein in said water is effected, said acrolein being present in said water in a concentration ranging between approximately 3 and 9 parts acrolein per million parts of water.

8. The method of treating a moving body of water to control aquatic plant and animal life comprising adding acrolein to said moving body of water to a concentration sufficient to control said aquatic plant and animal life.

9. The method of treating a moving body of water to control aquatic plant and animal life comprising adding acrolein to said moving body of water in a quantity toxic to said aquatic life.

10. The method of treating a moving body of water containing aquatic life to control said aquatic life contained therein comprising adding acrolein to said body of water in a quantity toxic to aquatic life.

11. The method of treating a moving body of water in an irrigation canal, said water having aquatic weeds submerged therein comprising adding acrolein to said water to a concentration toxic to said aquatic weeds at a substantial distance from said aquatic weeds and permitting said acrolein to be carried by said water into contact with said aquatic weeds.

12. The method of treating a moving body of water in an irrigation canal, said water having aquatic weeds submerged therein comprising adding acrolein to said water at a substantial distance from said aquatic weeds and permitting said acrolein to be carried into contact with said aquatic weeds, said acrolein being present in a concentration ranging from 1 to 10,000 parts acrolein per million parts water.

References Cited in the file of this patent

FOREIGN PATENTS 796,103    France _____ Mar. 30, 1936

OTHER REFERENCES

U.S. Dept. Agr. Tech. Bulletin, #162, March 1929, pp. 47, 48.